United States Patent [19]
Nakajima et al.

[11] Patent Number: 5,250,366
[45] Date of Patent: Oct. 5, 1993

[54] PHOSPHOR WHICH EMITS LIGHT BY THE EXCITATION OF X-RAY, AND A X-RAY INTENSIFYING SCREEN USING THE PHOSPHOR

[75] Inventors: Shigeharu Nakajima; Genichi Shinomiya; Mizuho Takeda; Satoru Chikutei, all of Anan, Japan

[73] Assignee: Nichia Kagaku Kogyo K.K., Tokushima, Japan

[21] Appl. No.: 882,243

[22] Filed: May 8, 1992

Related U.S. Application Data

[60] Continuation of Ser. No. 549,495, Jun. 29, 1990, abandoned, which is a division of Ser. No. 324,570, Mar. 16, 1989, Pat. No. 4,959,174, which is a continuation of Ser. No. 219,792, Jul. 14, 1988, abandoned, which is a continuation of Ser. No. 823,299, Jan. 28, 1986, abandoned.

[30] Foreign Application Priority Data

May 18, 1985 [JP] Japan ................................. 60-106636
Sep. 6, 1985 [JP] Japan ................................. 60-198052

[51] Int. Cl.$^5$ .............................................. C09K 11/78
[52] U.S. Cl. ................................. 428/690; 250/483.1; 252/301.4 R
[58] Field of Search ................. 252/301.4 R; 428/690; 250/483.1

[56] References Cited

U.S. PATENT DOCUMENTS

| | | | |
|---|---|---|---|
| 3,758,486 | 9/1973 | Ropp | 252/301.4 R |
| 4,032,471 | 6/1977 | Luckey | 252/301.4 R |
| 4,225,653 | 9/1980 | Brixner | 252/301.4 R |
| 4,473,513 | 9/1984 | Cusano et al. | 252/301.4 R |

Primary Examiner—Jack Cooper
Attorney, Agent, or Firm—Wenderoth, Lind & Ponack

[57] ABSTRACT

The phosphor and the X-rays intensifing screen according to the present inventin emit light by the excitation of X-ray, and they are used for medical and industrial radiography. In addition to the conventional contents of rare earth tantalate and/or rare earth niobate, the phosphor according to the present invention contains a determined quantity of divalent metal. This divalent metal content can make the improvement of the afterglow characteristic and the light emission characteristic of the phosphor. The phosphor according to the present invention is represented by the general formula (I) $M_yLn_{1-x-(\frac{2}{3})y}DO_4: xR^{3+}$ (I). In the general formula above, M is at least one divalent metal selected from the group consisting of Be, Mg, Ca, Sr, Ba, Zn and Cd, Ln being at least one selected from the group consisting of Y, Gd, La, and Lu, D being either or both of Ta and Nb, R being at least one selected from the group consisting of Tm, Pr, Sm, Eu, Tb, Dy and Yb or the base substance is self-activating, and y is a value in the range $1 \times 10^{-5} \leq y \leq 1$, and x is a value in the range $0 \leq y \leq 0.05$.

6 Claims, 9 Drawing Sheets

A  $Y_{0.995}TaO_4 : 0.005Tm$
B  $Sr_{0.075}Y_{0.945}TaO_4 : 0.005Tm$
C  $Cd_{0.15}Y_{0.895}TaO_4 : 0.005Tm$
D  $Ba_{0.015}Y_{0.985}TaO_4 : 0.005Tm$

PHOSPHOR WHICH EMITS LIGHT BY THE EXCITATION OF X-RAY, AND A X-RAY INTENSIFYING SCREEN USING THE PHOSPHOR

This application is a continuation of now abandoned application Ser. No. 07/549,495 filed on Jun. 29, 1990 which is a divisional of Ser. No. 07/324,570 filed Mar. 16, 1989 now U.S. Pat. No. 4,959,174 which is a continuation of Ser. No. 07/219,792 filed Jul. 14, 1988 and now abandoned, which is a continuation of Ser. No. 06/823,299 filed Jan. 28, 1986 and now abandoned.

BACKGROUND OF INVENTION

The present invention relates to a phosphor which emits light by the excitation of X-rays and a X-ray intensifing screen using the phosphor, and relates mainly to a X-ray intensifing screen used for medical and industrial radiography.

A phosphor which emits light by the excitation of X-rays is used mainly for X-ray intensifing screen. A X-ray intensifing screen is generally used in combination with photographic film for the purpose of improving the sensitivity of the photographic system for medical radiography. The phosphor used for such a X-ray intensifing screen is required to have a high X-ray dose, a high light emission efficiency, and a small afterglow component.

A X-ray intensifing screen coated with phosphor of a high X-ray dose has an excellent granularity of X-ray image and therefore can improve the diagnosis efficiency in medical radiography. A phosphor having a high light emission efficiency can be used with only a small quantity of X-ray irradiation, and thereby the exposure dose of the subject can be reduced. Further, a phosphor having a low quantity of afterglow component can prevents errors in consultation caused by after image (afterglow noise).

Recently, based on the desire for reducing exposure dose of the subjects, X-ray intensifing screens using a phosphor containing $Gd_2O_2S:Tb$, $BaFCl:Eu$, $LaOBr:Tm$, $YTaO_4:Tm$ or the like, instead of conventional phosphor of $CaWO_4$ have been put to practical use.

However, since $BaFCl:Eu$ and $LaOBr:Tm$ have low X-ray absorption dose, the granularity of the obtained X-ray photograph is not good. Further, since the phosphor is shaped into flat granules, light emitted by the excitation of X-rays is much scattered and the sharpness of the X-ray image becomes low.

A phosphor containing $Gd_2O_2S:Tb$ emits light in the range from the blue zone to the green zone, and is used in combination with an orthochromatic film which is sensitive in the range from the blue zone to the green zone. Therefore, the film is easily exposed to light even in the darkroom and the darkroom lamp is required to be dim, which causes poor workability.

A phosphor containing $YTaO_4:Tm$ has a high afterglow component, and afterglow noises occur during continuous photographing, which limits its use. If a phosphor is developed which has a small afterglow component and is provided with the advantages of $YTaO_4:Tm$ phosphor, an ideal phosphor for X-ray use can be realized.

SUMMARY OF INVENTION

The inventors have studied in various methods for producing phosphors containing rare earth tantalate and/or rare earth niobate, for the purpose of achieving the abovementioned object. As the result, they have succeeded in remarkably improving the afterglow characteristic of the phosphor by making the phosphor contain divalent metals in a particular quantity range. Further, the obtained phosphor containing a special quantity of divalent metal has not only a remarkably improved afterglow characteristic but can also show remarkably improved light emission efficiency.

In other words, the phosphor according to the present invention is represented by the general formula(I) $M_yLn_{1-x-(\frac{y}{3})y}DO_4: xR^{3+}$ (I) [in this formula, M being at least one kind of divalent metal selected from the group consisting of Be, Mg, Ca, Sr, Ba, Zn and Cd, Ln being at least one kind of element selected from the group consisting of Y, Gd, La, and Lu, D containing either or both of Ta and Nb, and R being at least one selected from the group consisting of Tm, Pr, Sm, Eu, Tb, Dy, Yb or the base substance being self-activating, and y being a numerical value in the range $1 \times 10^{-5} \leq y \leq 1$ and x being a numerical value in the range $0 \leq x \leq 0.05$].

If a large quantity of the divalent metal M is contained in the phosphor, the afterglow characteristic can be improved, but an excessive content thereof causes a lowering of the light emission efficiency.

The value y in the general formula indicating the content of the divalent metal M is determined as $1 \times 10^{-5} \leq y \leq 1$ from the consideration of the afterglow characteristic and the light emission efficiency. Further, an excessive quantity of the activator Tm, Pr, Sm, Eu, Tb, Dy or Yb causes to lower the light emission efficiency. However, the phosphor according to the present invention can be used without any activator since the base phosphor itself can emit light. The value of x in the general formula(I) indicating the content of the activator is determined as $0 \leq x \leq 0.05$ from the consideration of the light emission efficiency.

In the X-ray intensifing screen according to the present invention, the phosphor represented by the abovementioned general formula(I) is adhered in the dispersed state onto a support by means of a binding agent.

OBJECT OF THE INVENTION

An important object of the present invention is to provide a phosphor which can emit light by the excitation of X-rays, can absorb a large quantity of X-rays and has a high light emission efficiency and a small afterglow component.

Further, another important object of the present invention is to provide a X-ray intensifing screen which permits one to take a radiograph with only a small exposure dose of a subject and affords to make a correct diagnosis of the subject.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

DETAILED DESCRIPTION

The present invention relates to a phosphor and a X-ray intensifing screen using the phosphor. Therefore, there will be described the method for manufacturing a X-ray intensifing screen using the phosphor according to the present invention and the method for manufacturing the phosphor.

The X-ray intensifing screen mainly comprises a support and a phosphor layer provided on the support, the phosphor layer comprising a binding agent carrying the phosphor, the phosphor, represented by the abovementioned general formula(I) in dispersed state. The phosphor layer is formed on the support in the following way as well known.

Firstly, the phosphor represented by the abovementioned general formula(I) and an binding agent are added to a solvent and mixed together to prepare a coating liquid in which particles of the phosphor are uniformly dispersed in the binding agent solution. As the binding agent for the phosphor layer, nitrocellulose, polyalkyl(metha) acrylate, linear polyester, and their mixture can be used.

As the solvent for preparing the coating liquid, esters of lower fatty acids and lower alcohols such as ethyl acetate, butyl acetate, ketones such as acetone and methyl ethyl ketone, ethers such as dioxane and ethylene glycol monoethyl ether and their mixtures can be used.

The mixture ratio of the binding agent and the phosphor in the coating liquid is varied in accordance with the characteristic of the intensifing screen to be obtained or the particle size of the phosphor, but it is preferably selected in the range from 1:8 to 1:40(weight ratio).

Further, additive agents may be mixed into the coating liquid, such as a dispersing agent for improving the dispersibility of the phosphor particles and a plasticizer for improving the binding force between the binding agent and the phosphor particles.

The coating is formed by uniformly coating the coating liquid prepared as abovementioned on the support with a conventional coating member such as a doctor blade, a roll coater, a knife coater or the like.

After the coating is formed, the coating is dried whereby the formation of the phosphor layer on the support is completed. The thickness of the phosphor layer is varied with the characteristics of the intensifing screen to be obtained, the particle size of the phosphor and the mixture ratio of the binding agent and the phosphor, but it is preferably selected usually in the range from 70 μm to 700 μm.

The phosphor layer may comprise one layer or more than two layers. When more than two layers are laminated, at least one layer of them contains the phosphor represented by the general formula (I).

The material for making the support may be selected from many kind of conventional materials for the support of the intensifing screen. Such examples are plastic films of cellulose acetate, polyester, polyamide, polycarbonate, metal sheets of aluminum foil or aluminum alloy foil, or pigment papers containing titanic dioxide or the like.

When plastic films are used, a light absorptive material such as carbon black, or a light reflective material such as titanic dioxide may be blended thereinto. The former is a support suitable for a intensifing screen of a high sharpness type while the latter is suitable for a intensifing screen of a high sensitivity type.

Usually in a X-ray intensifing screen a transparent film for physically and chemically protecting the phosphor layer is provided on the surface of the phosphor layer opposite to the contact surface with the support. Preferably, such a transparent protective film is provided in a intensifing screen using the phosphor according to the present invention.

The transparent protective film can be formed by dissolving a cellulose derivative such as cellulose acetate or nitrocellulose, or a transparent polymeric substance such as polymetyl methacrylate, polycarbonate or polyvinyl acetate into a suitable solvent to prepare a solution, and coating the solution on the surface of the phosphor layer. Otherwise, the transparent protective film can be formed by adhering a transparent thin film separately made of polyethylene, polyethylene terephthalate or polyamide onto the surface of the phosphor layer with an adhesive agent.

Now, examples of the method for preparing a phosphor according to the present invention in the following. However, these examples will not limit the present invention.

EXAMPLE 1

112.3 g of yttrium oxide and 0.965 g of thulium oxide were dissolved in 340 ml of 10N hydrochloric acid. Pure water was added thereto to make 1000 ml of a solution. Then, the solution was heated to 80° C. with mixing. On the other hand, a water solution of oxalic acid obtained by dissolving 220 g of oxalic acid into 1000 ml of pure water was heated to 80° C. and added to the abovementioned 80° C. hydrochloric acid solution with mixing. Thus, in the solution, oxalate of yttrium and thulium was produced and precipitated together. The solution containing the precipitate was cooled in the air and then washed five times with water by decantation, and the precipitate was sucked and filtered. The precipitate was decomposed by heating at a temperature of 850° C. for 3 hours, whereby 113.2 g of oxide of oxalate was obtained. Then 64.1 g of thus obtained oxide of oxalate, 125 g of tantalic pentaoxide and 21 g of calcium chloride were well mixed and put in an alumina crucible and then calcined at a temperature of 1000° C. for 15 hours. The calcined substance was mixed with 62.5 g of lithium chloride and 0.4 g of boric acid and ground and blended together by a ball mill. Then, the obtained mixture was put into an alumina crucible, calcined at a temperature of 1200° C. for 10 hours, ground by a ball mill, washed with pure water five times by decantation and filtered by suction. Further, the obtained substance is dried at a temperature of 120° C. for 15 hours. The obtained phosphor was confirmed to be represented by the formula $Ca_{0.01}Y_{0.988\text{-}3}TaO_4:0.005Tm^{3+}$.

Figure 1:
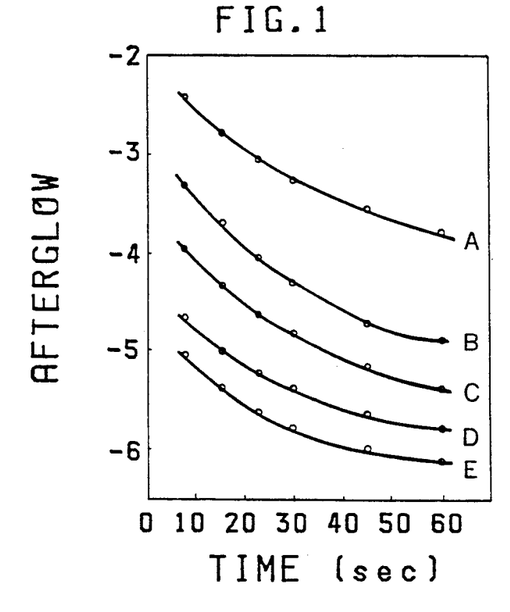
FIGS. 1 to 8 are graphs showing the afterglow characteristic and relative brightness of the phosphor which emits light by the excitation of X-rays.

As shown by the curve D in FIG. 1, this phosphor showed much lower afterglow characteristic than the conventional phosphor containing no calcium (shown by the curve A).

Figure 2:
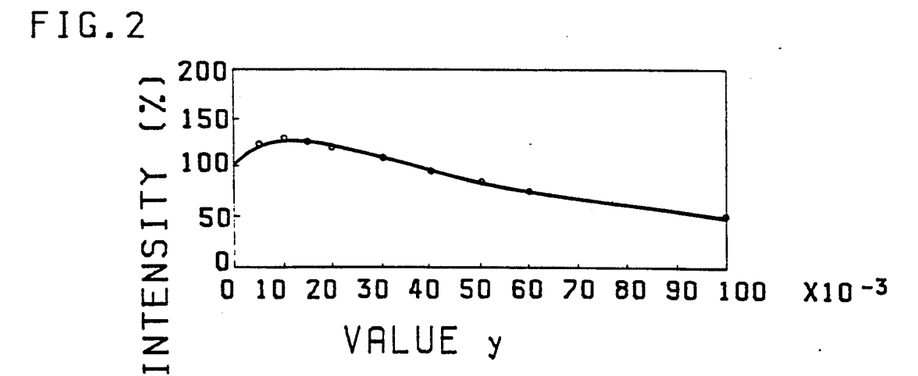

Further, as shown in FIG. 2, the relative brightness intensity of luminescence of the obtained phosphor was 130% when that of the control containing no calcium was 100%, and showed 30% improvement.

Then, using this phosphor, a X-ray intensifing screen was manufactured as described in the following. The phosphor particles were mixed with a linear polyester resin. To this mixture, methyl ethyl ketone and then nitrocellulose of a nitration degree of 11.5% were added, whereby the dispersed solution of the phosphor was prepared. Diethyl phthalate, phthalic acid and methyl ethyl ketone were added to the dispersed solution, and sufficiently stirred and mixed by a homogenizer whereby a coating liquid was prepared of which the mixture ratio of the binding agent and the phosphor was 1:20 (weight ratio), and the viscosity was 30PS(25° C.).

This coating liquid was blended into titanic dioxide disposed horizontally on a glass plate and then coated uniformly on a polyester sheet (support, 200 μm thick) with a doctor blade. After the coating was formed on the support, it is dried in a drier whereby a phosphor layer having a thickness of 180 μm was formed.

Then, a transparent polyethylene film is adhered onto the surface of the phosphor layer with a polyester adhesive agent to form a transparent protective film (10 μm thick), so that a X-ray intensifing screen was manufactured.

The sensitivity of this X-ray intensifing screen was improved by 30% in comparison with that of a conventional X-ray intensifing screen containing no calcium, and the exposure of the film to light caused by the afterglow was also remarkably reduced.

EXAMPLE 2

The phosphor was prepared using 63.6 g of yttrium oxide, 0.456 g of thulium oxide, 125 g of tantalic pentoxide and 29 g of strontium chloride in the same method as employed in Example 1. As the result, the phosphor represented by the constituent formula $Sr_{0.002}Y_{0.993}TaO_4:0.005Tm^{3+}$.

This phosphor has a remarkably smaller afterglow component than that of the conventional phosphor containing no strontium. (FIG. 3) Further, the relative brightness was improved by 80% in comparison with the control containing no strontium. (FIG. 4)

Using this phosphor, a X-ray intensifing screen was manufactured in the same way as described in Example 1. It was confirmed that the sensitivity of the X-ray intensifing screen was improved nearly by 80% in comparison with the control containing no strontium, and the afterglow characteristic was also remarkably excellent.

EXAMPLE 3

The phosphor was prepared in the same method as employed in Example 1, except using 63.8 g of yttrium oxide, 0.218 g of thulium oxide, 125 g of tantalic pentoxide and 1.1 g of magnesium chloride. As the result, the phosphor represented by the constituent formula $Mg_{0.06}Y_{0.958}TaO_4:0.002Tm^{3+}$.

The relative brightness and the relative afterglow quantity of this phosphor were measured in comparison with the conventional phosphor containing no magnesium (represented by the constituent formula $Y_{0.998}TaO_4:0.002Tm^{3+}$) and the results are shown in Table 1. In Table 1, the relative afterglow quantity is represented by Log [afterglow quantity after 30 seconds/light emission quantity].

EXAMPLE 4

Using 63.8 g of yttrium oxide, 0.218 g of thulium oxide, 125 g of tantalic pentoxide and 17 g of barium chloride, the phosphor was prepared in the same method as employed in Example 1. As the result, the phosphor represented by the constituent formula $Ba_{0.001}Y_{0.99733}TaO_4:0.002Tm^{3+}$ was obtained.

The relative brightness and the relative afterglow quantity were measured in comparison with the conventional phosphor 4 containing no barium (represented by the constituent formula $Y_{0.998}TaO_4:0.002Tm^{3+}$), and the results are shown in table 1.

EXAMPLE 5

Using 99.1 g of gadolinium oxide, 0.328 g of thulium oxide, 125 g of tantalic pentoxide and 0.71 g of beryllium oxide, the phosphor was prepared in the same method as employed in Example 1. As the result, the phosphor represented by the constituent formula $Be_{0.005}Gd_{0.9937}TaO_4:0.003Tm^{3+}$ was obtained. The relative brightness and the relative afterglow quantity were measured in comparison with the conventional phosphor 5 containing no beryllium (represented by the constituent formula $Gd_{0.997}TaO_4:0.003Tm^{3+}$), and the results are shown in Table 1.

EXAMPLE 6

Using 31.7 g of yttrium oxide, 50.9 g of gadolinium oxide, 0.546 g of thulium oxide, 125 g of tantalic pentoxide and 0.71 g of zinc carbonate, the phosphor was prepared in the same way as employed in Example 1. As the result, the phosphor represented by the constituent formula $Zn_{0.01}Y_{0.49415}Gd_{0.49415}TaO_4:0.005Tm^{3+}$ was obtained. The relative brightness and the relative afterglow quantity were measured in comparison with the conventional phosphor 6 containing no zinc (represnted by the constituent formula $Y_{0.4975}Gd_{0.4975}TaO_4:0.005Tm^{3+}$), and the results are shown in Table 1.

EXAMPLE 7

Using 31.7 g of yttrium oxide, 45.8 g of lanthanum oxide, 0.546 g of thulium oxide, 125 g of tantalic pentoxide and 0.98 g of cadmium carbonate, the phosphor was prepared in the same way as employed in Example 1. As the result, the phosphor represented by the constituent formula $Cd_{0.01}Y_{0.49415}La_{0.09415}TaO_4:0.005Tm^{3+}$ was obtained. The relative brightness and the relative afterglow quantity were measured in comparison with the conventional phosphor 7 containing no cadmium (represented by the constituent formula $Y_{0.4975}La_{0.4975}TaO_4:0.005Tm^{3+}$), and the results are shown in Table 1.

EXAMPLE 8

Using 63.6 g of yttrium oxide, 0.456 g of thulium oxide, 124.4 g of tantalic pentoxide, 0.376 g of niobic pentoxide, and 29 g of strontium chloride, the phosphor was prepared in the same way as employed in Example 1. As the result, the phosphor represented by the constituent formula $Sr_{0.002}Y_{0.9937}Ta_{0.995}Nb_{0.005}O_4:0.005Tm^{3+}$ was obtained. The relative brightness and the relative afterglow quantity were measured in comparison with the conventional phosphor containing no strontium (represented by the constituent formula $Y_{0.995}Ta_{0.995}Nb_{0.005}O_4:0.005Tm^{3+}$), and the results are shown in Table 1.

EXAMPLE 9

107.26 g of yttrium oxide, 11.07 g of strontium carbonate, 220.95 g of tantalic pentoxide were mixed with 25 g of lithium chloride as a flux and ground and blended together by a ball mill.

Then the obtained mixture was put in an alumina crucible and then calcined at a temperature of 1200° C. for 10 hours. The calcined substance was ground by a ball mill, washed with pure water five times by decantation and filtered by suction. Further the obtained substance was dried at a temperature of 120° C. for 15 hours. The obtained substance was confirmed to be represented by the general formula $Sr_{0.075}Y_{0.950}TaO_4$. As shown in Table 2, this phosphor showed much lower afterglow quantity than the conventional phosphor 9 containing no strontium($YTaO_4$) and the relative brightness thereof were improved by 44% in comparison with the conventional phosphor 9.

Then, using this phosphor, a X-ray intensifing screen was manufactured in the same method as employed in Example 1. The sensitivity of this X-ray intensifing screen was improved by 29% in comparison with that of a conventional X-ray intensifing screen containing no strontium, and the film was not exposed by the afterglow. (Table 2)

EXAMPLE 10

Using 107.26 g of yttrium oxide, 7.51 g of calcium carbonate and 220.95 g of tantalic pentoxide, the phosphor was prepared in the same method as employed in Example 9. As the result, the phosphor represented by the constituent formula $Ca_{0.075}Y_{0.950}TaO_4$ was obtained. As shown in Table 2, the afterglow component of the phosphor was remarkably lower than that of the conventional phosphor containing no calcium. Further, the relative brightness of this phosphor was improved by 23% in comparison with the conventional phosphor containing no calcium. (Table 2) When this phosphor was used for manufacturing a X-ray intensifing screen, the sensitivity thereof was improved by 21% in comparison with that of the conventional phosphor 9 containing no calcium, and the afterglow characteristic was also remarkably excellent.

EXAMPLE 11

Using 110.65 g of yttrium oxide, 5.92 g of barium carbonate and 220.95 g of tantalic penta oxide, the phosphor was prepared in the same method as employed in Example 9. As the result, the phosphor represented by the constituent formula $Ba_{0.03}Y_{0.98}TaO_4$ was obtained. The relative brightness of this phosphor was improved by 49% in comparison with the conventional phosphor 9 and the relative afterglow quantity was reduced nearly to ½ of that of the latter. (Table 2) Further, when this phosphor was used for manufacturing a X-ray intensifing screen, the sensitivity thereof was improved by 40% in comparison with the conventional phosphor 9. (Table 2)

EXAMPLE 12

Using 110.65 g of yttrium oxide, 2.53 g of magnesium carbonate and 220.95 of tantalic pentoxide, the phosphor was prepared in the same method as used in Example 9. As the result, the phosphor represented by the constituent formula $Mg_{0.03}Y_{0.98}TaO_4$ was obtained. The relative brightness and the relative afterglow quantity were measured in comparison with those of the conventional phosphor 9 containing no magnesium and the results are shown in Table 2.

Further, the sensitivity of a X-ray intensifing screen in which the phosphor was used was improved by 23% in comparison with the conventional phosphor 9 containing no magnesium. (Table 2)

EXAMPLE 13

Using 101.62 g of yttrium oxide, 25.86 g of cadmium carbonate, and 220.95 g of tantalic pentoxide, the phosphor was prepared in the same method as employed in Example 9. As the result, the phosphor represented by the constituent formula $Cd_{0.15}Y_{0.90}TaO_4$ was obtained. The relative brightness of this phosphor was improved by 43% and the relative afterglow quantity was reduced to 1/360 in comparison with the conventional phosphor 9. When this phosphor was used for manufacturing a X-ray intensifing screen, the sensitivity was improved by 41% in comparison with the conventional phosphor 9. (Table 2)

EXAMPLE 14

Using 110.65 g of yttrium oxide, 3.76 g of zinc carbonate and 220.95 g of tantalic pentoxide, a phosphor was prepared in the same method as employed in Example 9. As the result, the phosphor represented by the constituent formula $Zn_{0.03}Y_{0.98}TaO_4$ was obtained. The relative brightness and the afterglow quantity were measured in comparison with the conventional phosphor 9 containing no zinc and the results were shown in Table 2.

When this phosphor was used for manufacturing a X-ray intensifing screen, the sensitivity was improved by 27% in comparison with the conventional phosphor 9. (Table 2)

EXAMPLE 15.

110.08 g of yttrium oxide and 0.96 g of thulium oxide were dissolved into 340 ml of 10N hydrochloric acid in the ionic state. Pure water was added to make the solution 1000 ml. Then the solution was heated to 80° C. with stirring. On the other hand, 220 g of oxalic acid was dissolved in 1000 ml of pure water and this aqueous solution of oxalic acid was heated to a temperature of 80° C. and then added with stirring to the abovementioned hydrochloric acid solution heated to 80° C. Thus, in the mixed solution, oxalates of yttrium and thulium were produced and precipitated together.

After this solution containing the precipitate was cooled in the air, it was washed five times with pure water by decantation, and the precipitate was filtered by suction. The precipitate was heat-decomposed at a temperature of 850° C. for 3 hours to obtain the oxide of oxalate.

Using 111.04 g of thus obtained oxide, 0.75 g of beryllium oxide, 219.85 g of tantalic pentoxide and 0.66 g of niobium pent-oxide, a phosphor was prepared in the same method as employed in Example 9. As the result, the phosphor represented by the constituent formula $Be_{0.03}Y_{0.975}Ta_{0.995}Nb_{0.005}O_4$: 0.005 $Tm^{3+}$ was obtained.

The relative brightness and the relative afterglow quantity were measured in comparison with the conventional phosphor 10 containing no beryllium and the results were shown in Table 2.

EXAMPLE 16

Using 110.08 g of yttrium oxide, 0.96 g of thulium oxide, 4.43 g of strontium carbonate and 220.95 g of tantalic pentoxide, a phosphor was prepared in the same method as employed in Example 15. As the result, the phosphor represented by the constituent formula $Sr_{0.030}Y_{0.975}TaO_4$: 0.005 $Tm^{3+}$ was obtained. The relative brightness and the relative afterglow quantity were measured in comparison with the conventional phosphor 10 containing no strontium and the results were shown in Table 2.

EXAMPLE 17

Using 50.53 g of yttrium oxide, 81.11 g of gadolinium oxide, 0.96 g of thulium oxide, 29.60 g of barium carbonate and 220.95 g of tantalic pentoxide, a phosphor was prepared in the same method as employed in Example 15. As the result, the phosphor represented by the constituent formula $Ba_{0.1500}Y_{0.4475}Gd_{0.4475}TaO_4$: 0.005 $Tm^{3+}$ was obtained.

The relative brightness and the relative afterglow quantity were measured in comparison with those of the conventional phosphor 11 containing no barium. And the results were shown in Table 2.

EXAMPLE 18

Using 44.88 g of yttrium oxide, 64.76 g of lanthanum oxide, 0.96 g of thulium oxide, 51.72 g of cadmium carbonate, and 220.95 g of tantalic pentoxide, a phosphor was prepared in the same method as employed in Example 15. As the result, the phosphor represented by the constituent formula $Cd_{0.300}Y_{0.3975}La_{0.3975}TaO_4$:0.005$Tm^{3+}$ was obtained.

The relative brightness and the relative afterglow quantity were measured in comparison with the conventional phosphor 12 containing no cadmium, and the results are shown in Table 2.

In Table 2, the relative afterglow quantity is represented by Log [afterglow quantity after 30 seconds/light emission quantity]. In the abovementioned general formula (I) of the phosphor according to the present invention, Ln can comprise Lu instead of Y, Gd or La used in Examples 1 to 18.

The phosphor according to the present invention can be used without containing any activator since the base substance itself can emit light as shown in Examples 9 to 14.

Further, in the phosphor according to the present invention the base substance of which can emit light, Ce, Pr, Nd, Sm, Eu, Tb, Dy, Yb or the like can be used as an activator in addition to or instead of Tm.

The phosphor according to the present invention which is represented by the abovementioned general formula (I) can show an excellent X-ray absorption characteristic and a remarkably improved afterglow characteristic. Further, by controlling the content of each element in the predetermined range, the phosphor according to the present invention can emit light of higher brightness than the conventional phosphor does.

By a X-ray intensifing screen in which the phosphor represented by the general formula (I) is used, images of high quantity and free from afterglow noises can be obtained consistently and the sensitivity of the X-ray image can be improved, and besides, the exposure dose of the subject can be reduced. These will be now described with reference to the appended drawing.

In FIG. 1, the curve C indicates the afterglow characteristic of the phosphor when in the general formula (I) $M_yLn_{1-x-(\frac{5}{3})y}DO_4:xR^{3+}$ (I), M is Ca, Ln being Y, R being Tm, D being Ta, $y=1\times10^{-4}$, and $x=0.005$, that is, the phosphor $Ca_{0.0001}Y_{0.9949}TaO_4$:0.005$Tm^{3+}$. For the purpose of comparison, the afterglow characteristic of the conventional phosphor when $y=0$, that is, the phosphor $Y_{0.995}TaO_4$:0.005$Tm^{3+}$ is represented by the curve A.

In FIG. 1, the ordinate indicates the relative afterglow quantity (the logarithmic value of [light emission quantity after a lapse of time/light emission quantity at the time of X-ray excitation]), while the abscissa indicates the decay time of the afterglow (the lapse of time from stopping the X-ray radiation).

It is shown in FIG. 1 that the phosphor according to the present invention in which $y=1\times10^{-4}$ has a remarkably excellent afterglow characteristic in comparison with the conventional phosphor in which $y=0$. Further in FIG. 1, the afterglow characteristics of the phosphors are shown when in the abovementioned general formula (I) $M_yLn_{1-x-(\frac{5}{3})y}DO_4: xR^{3+}$ M is Ca, Ln being Y, R being Tm, D being Ta, $x=0.005$ and $y=1\times10^{-5}$, $y=1\times10^{-2}$ and $y=1\times10^{-1}$. That is, the afterglow characteristics of the phosphors $Ca_{0.00001}Y_{0.99499}TaO_4$: 0.005$Tm^{3+}$, $Ca_{0.01}Y_{0.9883}TaO_4$: 0.005$Tm^{3+}$ (phosphor obtained in Example 1) and $Ca_{0.1}Y_{0.9283}TaO_4$: 0.005$Tm^{3+}$ are indicated by the curves B, D and E in this order.

It is apparent from FIG. 1 that the phosphors according to the present invention in which $y=1\times10^{-2}$ and $y=1\times10^{-1}$ have especially more excellent afterglow characteristics than the conventional phosphor in which $y=0$.

Now, taking the case of the phosphor $Ca_yY_{0.995-(\frac{5}{3})y}TaO_4$: 0.005$Tm^{3+}$ according to the present invention, the influence of the calcium content upon the light emission characteristic will be described with reference to FIG. 2. In FIG. 2, the ordinate indicates the brightness (relative value) of the light emitted by the X-ray excitation while the abscissa indicates the calcium content y of the phosphor.

According to FIG. 2, the light emission efficiency was remarkably improved when $2\times10^{-3}\leq y\leq30\times10^{-3}$ in the abovementioned constituent formula and the brightness then was improved by 30% at most in comparison with the phosphor in which $y=0$, that is, the phosphor having no calcium content.

Then, taking the case of the phosphor $Sr_yY_{0.995-(\frac{5}{3})y}TaO_4$: 0.005$Tm^{3+}$ according to the present invention, the influence of the strontium content upon the afterglow characteristic and the light emission characteristic will be described with reference to FIGS. 3 and 4.

Figure 3:
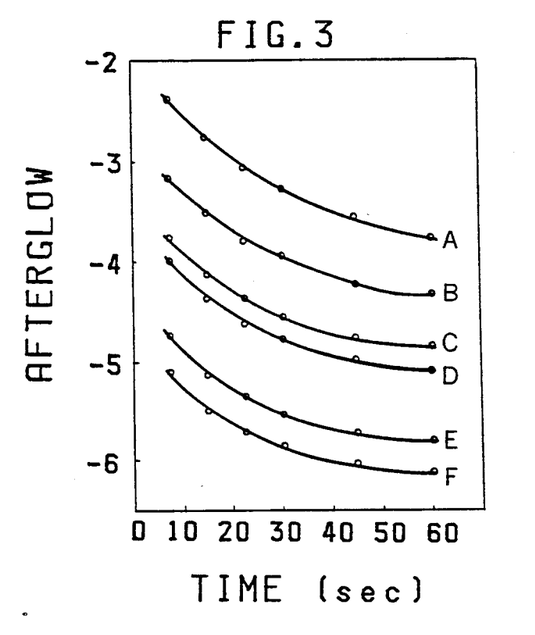
Figure 4:
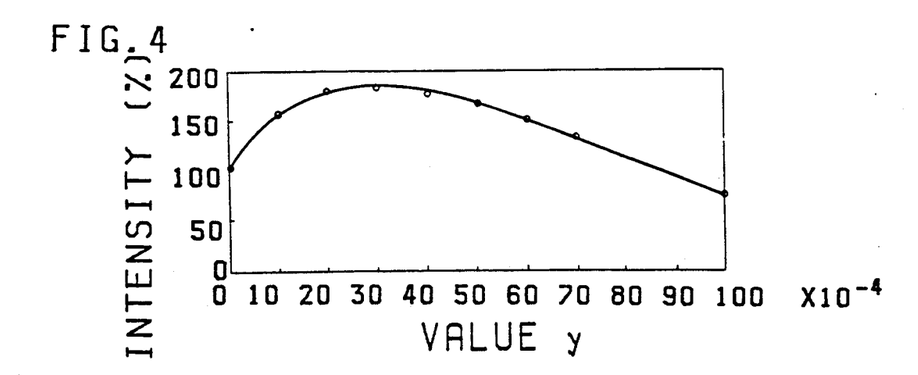

FIG. 3 shows the influence of the strontium content (the value y) of the phosphor $Sr_yY_{0.995-(\frac{5}{3})y}TaO_4$: 0.005$Tm^{3+}$ upon the afterglow characteristic. In this figure, the curves A, B, C, D, E or F indicate the afterglow characteristics of the phosphors according to the present invention in which in the abovementioned general formula $y=0$, $y=1\times10^{-5}$, $y=5\times10^{-5}$, $y=1\times10^{-4}$, $y=2\times10^{-3}$ (obtained in Example 2) and $y=1\times10^{-2}$ in this order.

It is apparent from this figure that when the value y was above $1\times10^{-5}$, the afterglow characteristic was remarkably improved.

Further, as apparent from the light emission characteristics shown in FIG. 4, the relative brightness of the abovementioned phosphor $Sr_yY_{0.995-(\frac{5}{3})y}TaO_4$: 0.005$Tm^{3+}$ was remarkably improved when the strontium content y was above $5\times10^{-4}$, and when $1\times10^{-3}\leq y\leq6\times10^{-3}$ the relative brightness was improved by 50% to 80% in comparison with the phosphor in which y=0, that is, having no strontium content.

FIGS. 5 to 8 show the afterglow characteristics of the phosphors obtained in Examples 9 to 11 and 13.

Figure 5:
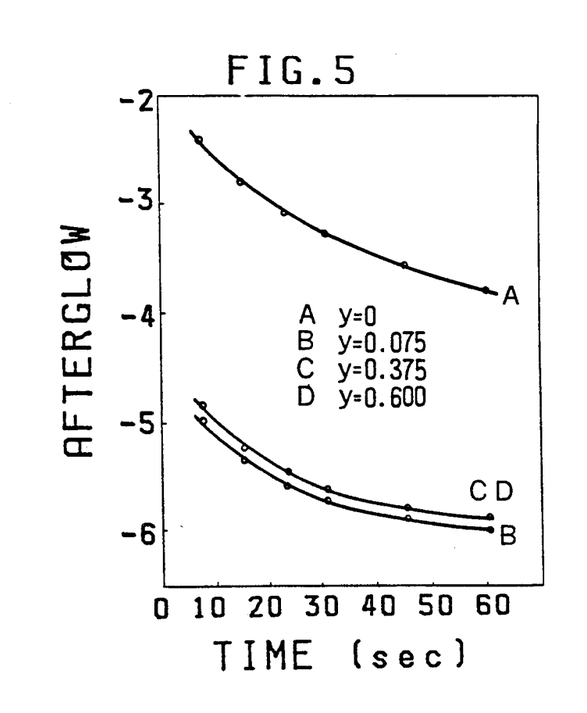

In FIG. 5, the curve B indicates the afterglow characteristic of the phosphor $M_yLn_{1-x-(\frac{3}{2})y}DO_4$: $xR^{3+}$ in which M is Sr, Ln being Y, D being Ta, y=0.075 and x=0, that is the phosphor $Sr_{0.075}Y_{0.950}TaO_4$. For the purpose of comparison, the curve A indicates the afterglow characteristics of the conventional phosphor in which y=0, that is, the phosphor $YTaO_4$.

In FIG. 5, the ordinate indicates the relative afterglow quantity (log [light emission quantity after a predetermined time/light emission quantity at the time of X-ray excitation]) while the abscissa indicates the decay time of the afterglow (the lapse of time after stopping the X-ray radiation).

It is apparent from FIG. 5 that the phosphor obtained in Example 9 in which y=0.075 has a much more excellent afterglow characteristic than the conventional phosphor in which y=0. Further, in FIG. 5, the curves C and D indicate the afterglow characteristics of the phosphors in the abovementioned general formula (I) $MyLn_{1-x-(\frac{3}{2})y}DO_4$: $xR^{3+}$, M is Sr, Ln-being Y, D being Ta, x=0 and y=0.375 and y=0.600, that is, the phosphors $Sr_{0.375}Y_{0.750}TaO_4$ and $Sr_{0.600}Y_{0.600}TaO_4$ in this order.

It is apparent from this figure that the phosphors according to the present invention in which y=0.075, y=0.375, and y=0.600 have especially much more excellent afterglow characteristics more than the conventional phosphor in which y=0.

Figure 6:
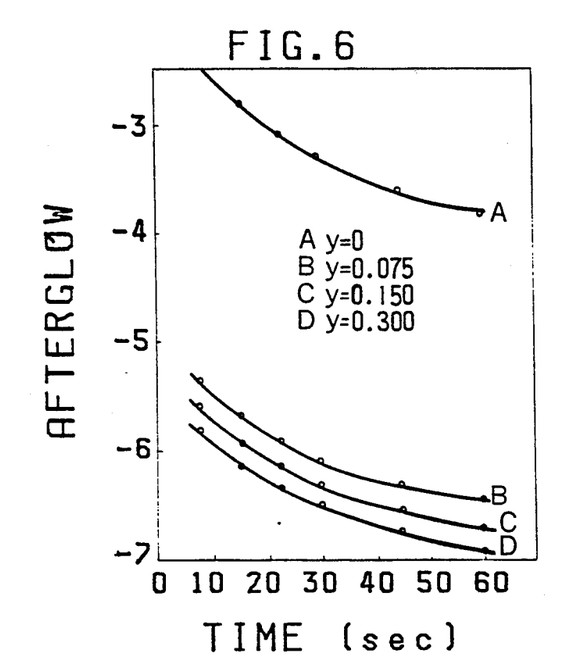

In FIG. 6, the curve B indicates the afterglow characteristic of the phosphor $MyLn_{1-x-(\frac{3}{2})y}DO_4$: $xR^{3+}$ in which M is Ca, Ln being Y, D being Ta, y=0.075 and x=0, that is, the phosphor $Ca_{0.075}Y_{0.950}TaO_4$ which was obtained in Example 10. For the purpose of comparison, the afterglow characteristic of the conventional phosphor in which y=0, that is, the phosphor $YTaO_4$ is indicated by the curve A.

It is apparent from FIG. 6 that the phosphor according to the present invention in which y=0.075 and which was obtained in Example 10 has a much more excellent afterglow characteristic than that of the conventional phosphor in which y=0. Further in FIG. 6, the afterglow characteristics of the phosphors $MyLn_{1-x-(\frac{3}{2})y}DO_4$: $xR^{3+}$ in which M is Ca, Ln being Y, D being Ta, x=0 and y=0.150 and y=0.300, that is, the phosphors $Ca_{0.150}Y_{0.900}TaO_4$ and $Ca_{0.300}Y_{0.800}TaO_4$ are indicated by the curve C and D in this order. It is apparent from this figure that the phosphors according to the present invention in which y=0.075, y=0.150 and y=0.300 have especially much more excellent afterglow characteristics than that of the conventional phosphor in which y=0.

Figure 11:
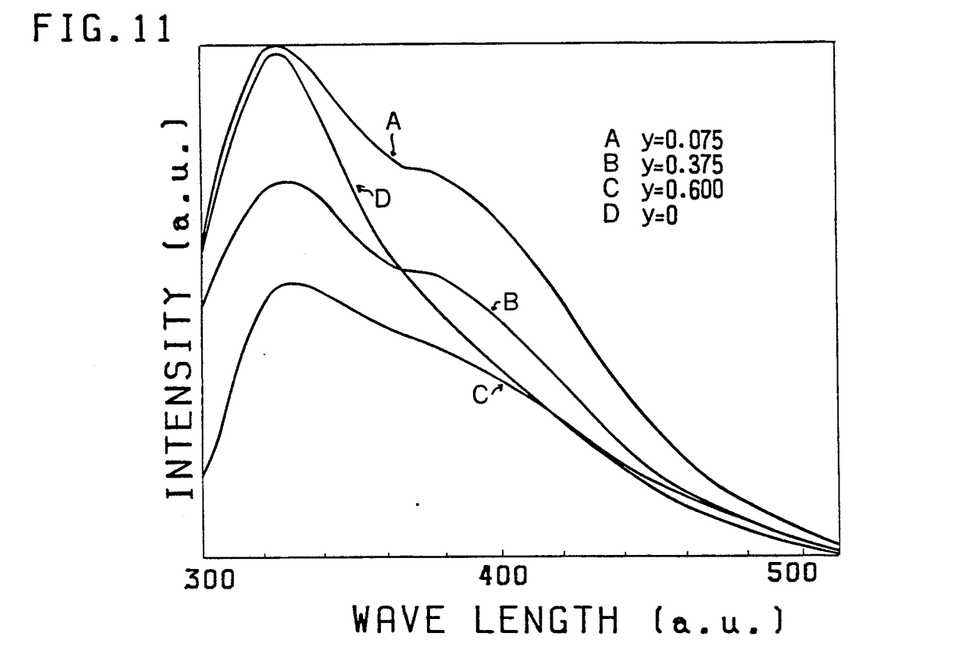
Figure 12:
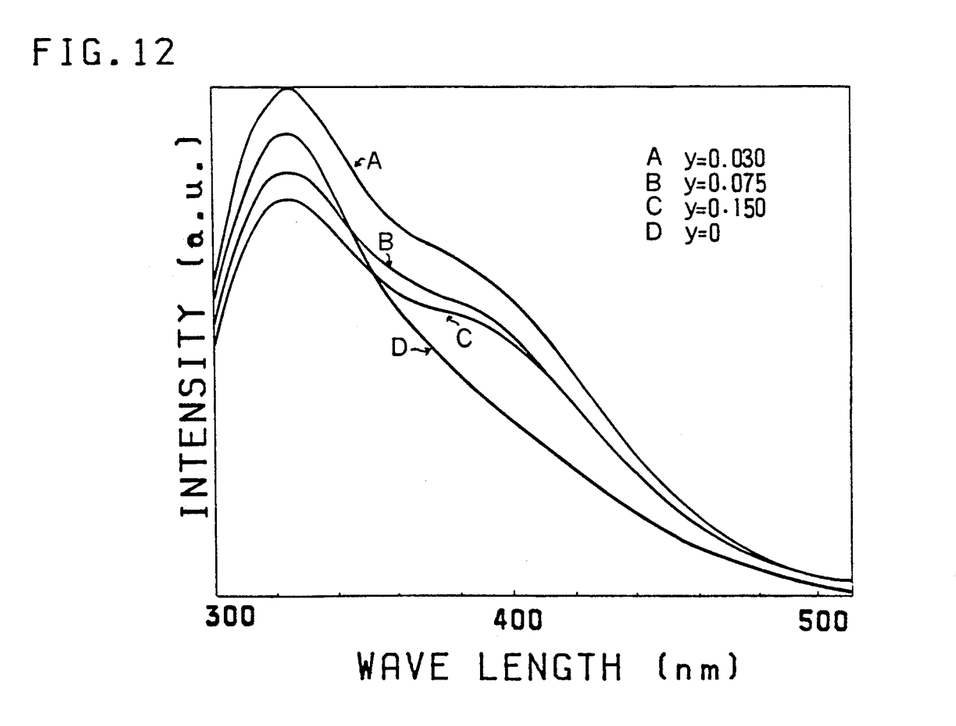
Figure 13:
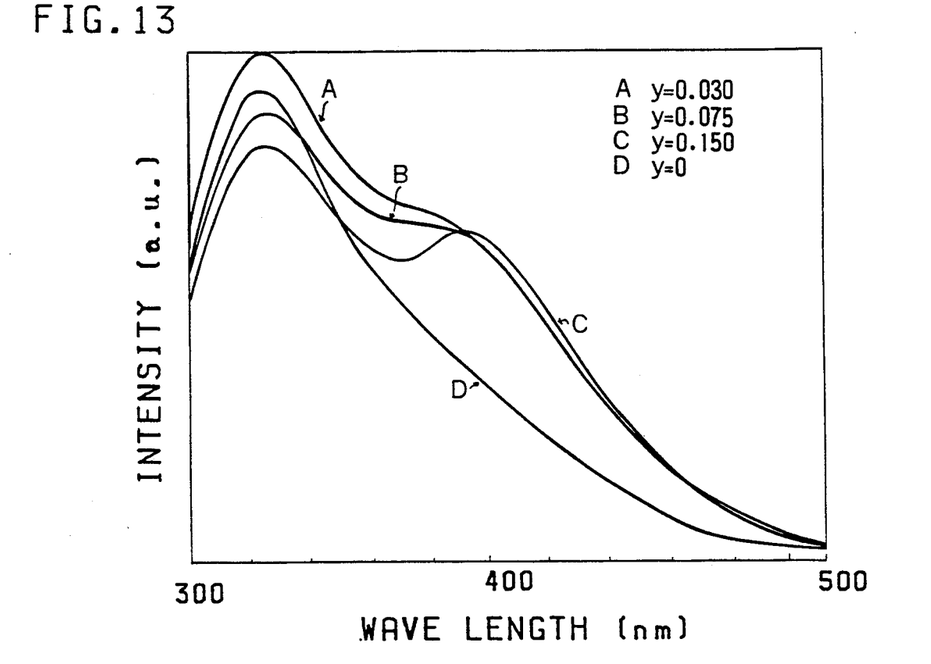
Figure 15:
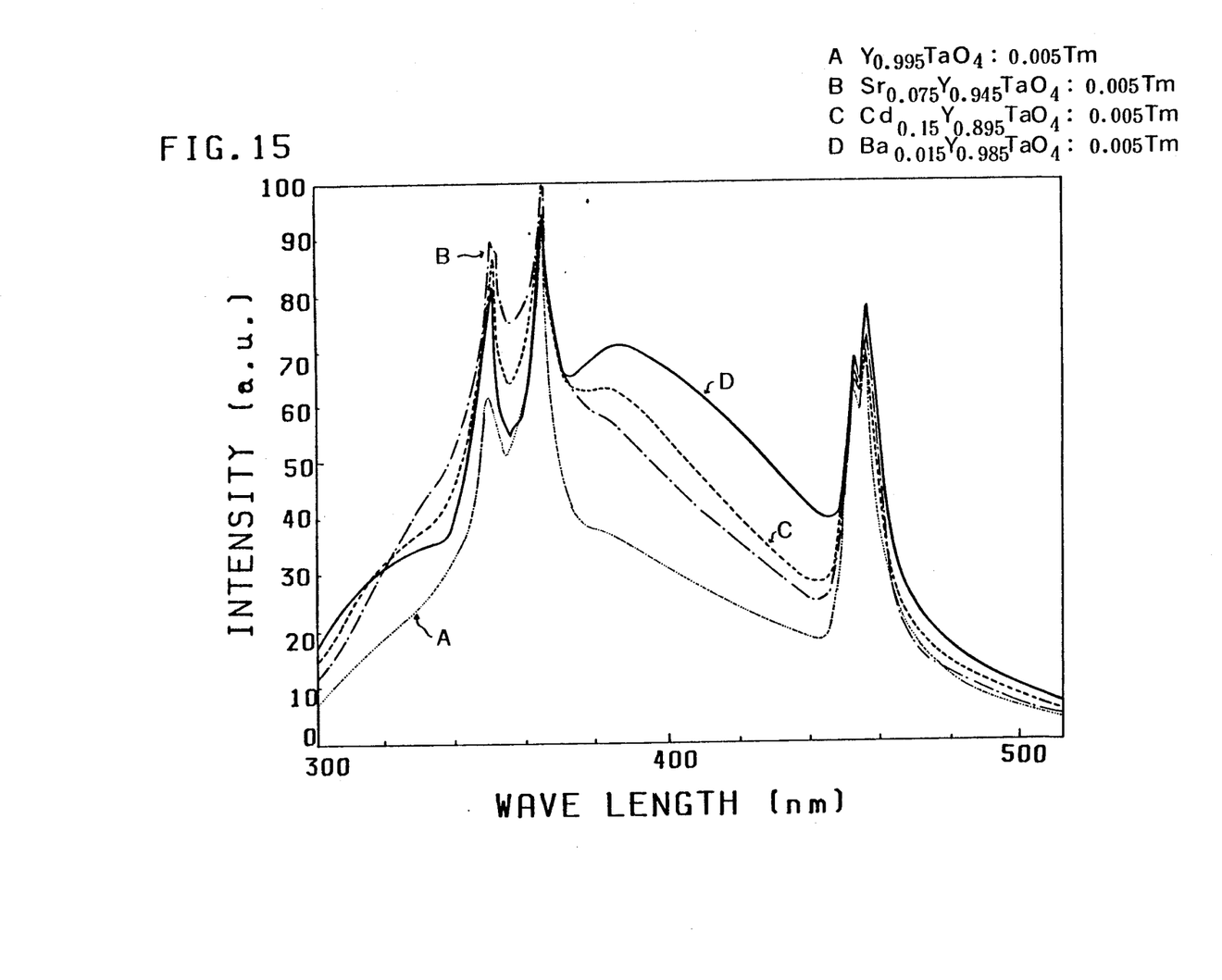

Now, the light emission characteristic of the phosphor $Sr_yY_{1-x-(\frac{3}{2})y}TaO_4$: $xTm^{3+}$ will be described with reference to FIGS. 11 and 15. FIGS. 11 and 15 show the light emission spectrum and the abscissa indicates the light emission wave length (nm unit) while the ordinate indicates the light emission quantity (optional unit).

In FIG. 11, the curves A, B and C indicate the light emission spectra of the phosphors according to the present invention in which y=0.075, 0.375 and 0.600 respectively and x=0, that is, the phosphors $Sr_{0.075}Y_{0.950}TaO_4$ (the curve A), $Sr_{0.375}Y_{0.750}TaO_4$ (the curve B) and $Sr_{0.600}Y_{0.600}TaO_4$ (the curve C), while the curve D indicates the light emission spectrum of the conventional phosphor $YTaO_4$.

It is apparent from this figure, the phosphors according to the present invention in which y=0.075, 0.375 and 0.600 respectively have broader light emission spectra than that of the conventional phosphor in which y=0 and have the second light emission peak near 370 nm. Especially, the phosphor in which y=0.075 and which is indicated by the curve A has much more light emission quantity than the conventional phosphor containing no strontium.

Further, in FIG. 15, the curves A and B indicate the light emission spectra of the conventional phosphor $Y_{0.995}TaO_4$: $0.005Tm^{3+}$ and phosphor according to the present invention $Sr_{0.075}Y_{0.945}TaO_4$: $0.005Tm^{3+}$ in this order. It is apparent from this figure that in comparison with the conventional phosphor (the curve A), the phosphor according to the present invention (the curve B) not only becomes higher light emission peak near 350 nm of $Tm^{3+}$ as an activator but also remarkably increased light emission quantity near 300 nm to 370 nm to 440 nm of the base substance.

Now, the afterglow characteristic and the light emission characteristic of the phosphor $Cd_yY_{1-x-(\frac{3}{2})y}TaO_4$: $xTm^{3+}$ according to the present invention will be described with reference to FIGS. 8, 14 and 15.

Figure 8:
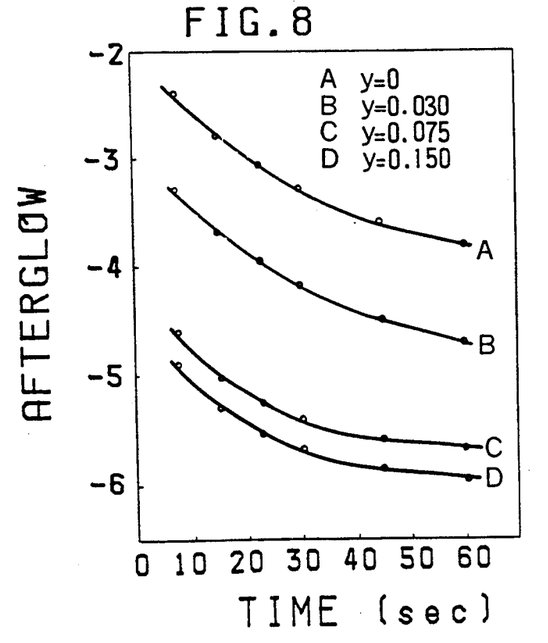
Figure 9:
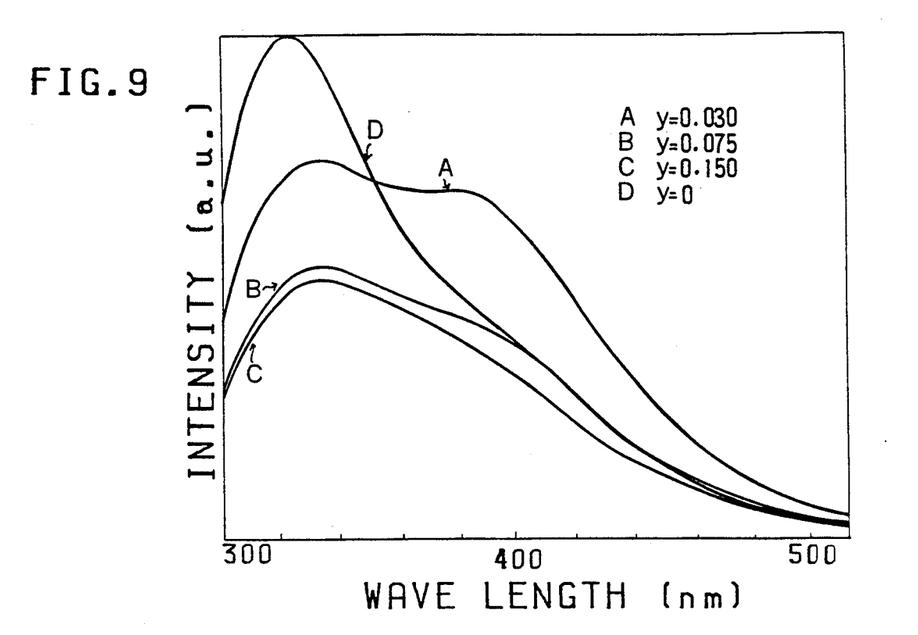
FIGS. 9 to 15 are graphs showing the light emission spectra of the phosphor when the element M and the value y in the general formula (I) are changed.
Figure 10:
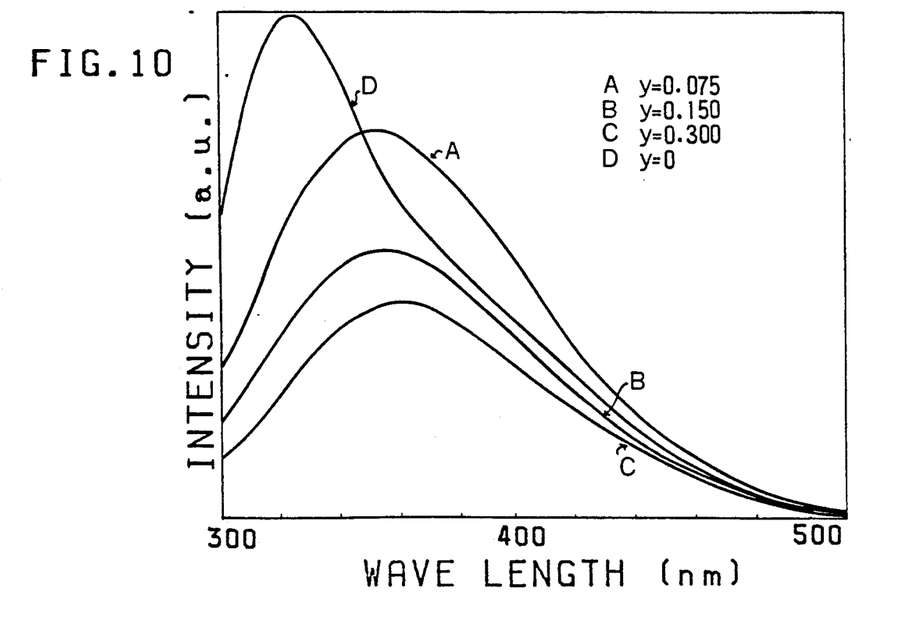

FIG. 8 shows, taking the case of the phosphor $Cd_yY_{1-(\frac{3}{2})y}TaO_4$, the influence of the cadmium content (the value y) upon the afterglow characteristic. In this figure, the curves A, B, C and D indicate the afterglow characteristics of the phosphors in which in the abovementioned general formula, y=0, y=0.030, y=0.075 and y=0.150 in this order.

It is apparent from this figure that the afterglow characteristics of the phosphors in which y=0.030, y=0.075 and y=0.150 were remarkably improved in comparison with that of the conventional phosphor in which y=0.

Figure 14:
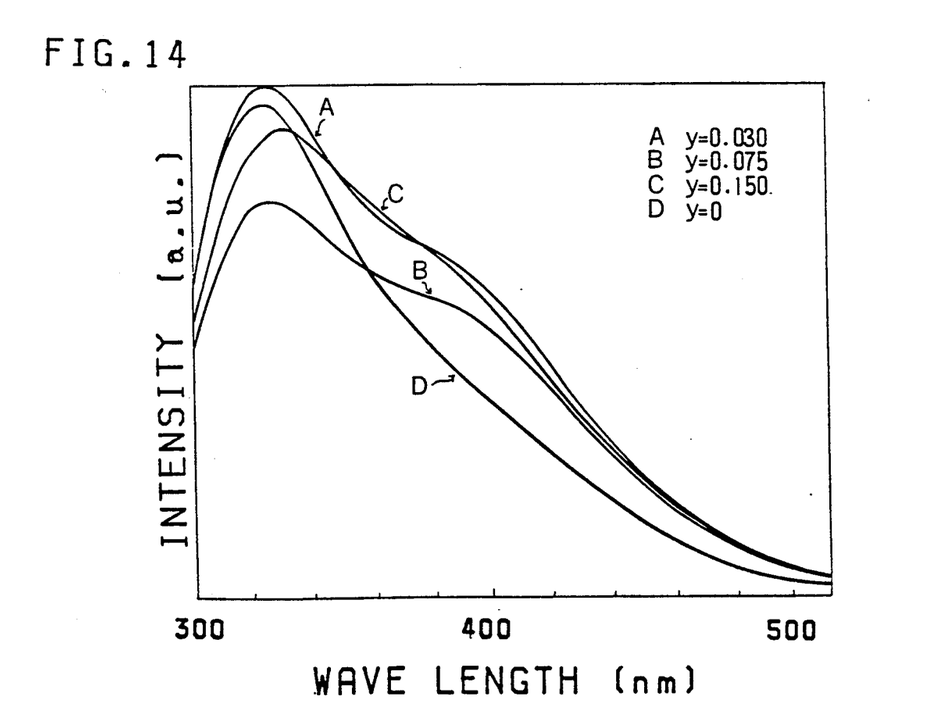

Further it is apparent from FIG. 14, the phosphors $Cd_yY_{1-(\frac{3}{2})y}TaO_4$ (the curves A, B and C) have broader light emission spectra than the conventional phosphor $YTaO_4$ (the curve D) and especially the phosphor in which y=0.030 (the curve A) has a remarkably increased light emission quantity. Further, as shown in FIG. 15, in the phosphor according to the present invention (the curve C), both of the activator $Tm^{3+}$ and the base substance have remarkably increased light emission quantities compared with conventional phosphor (the curve D).

Such inclinations shown in FIGS. 6, 8, 11, 14 and 15 are realized when in the general formula (I), M is Be, Mg, Ca, Ba and Zn, and the afterglow characteristic and the light emission quantity can be improved.

Figure 7:
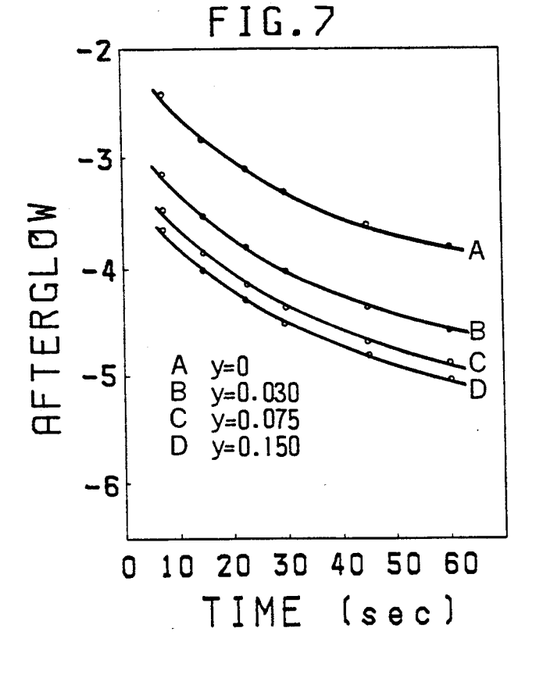

FIG. 7 shows the afterglow characteristic of the phosphor in which in the general formula (I), M is Ba. As apparently seen from the curves B, C and D, the phosphors according to the present invention showed more excellent afterglow characteristics than the conventional phosphor (the curve A).

Further, in FIGS. 9, 10, 12 and 13, the light emission characteristics of the phosphors according to the present invention in which in the general formula (I), M is Mg, Ca, Ba, and Zn. As apparently seen from these figures, the phosphors according to the present invention (the curve A, B and C) have broader light emission spectra and much more increased light emission quantities than the conventional phosphor in which y=0 (the curve D).

Further, as shown in Table 2, the X-ray intensifing screen using the abovementioned phosphor according to the present invention showed an excellent light emission brightness which is 60 to 140% when the light emission brightness of a X-ray intensifing screen using the conventional phosphor YTaO4 is regarded as 100%. The light emission brightness of the X-ray intensifing screen was similar to that of the phosphor powder, and the X-ray intensifing screen in which the phosphor powder having a high light emission brightness was used also showed a high light emission brightness. The afterglow characteristic of the phosphor powder did not change when it was used for the X-ray intensifing screen, and a X-ray intensifing screen having an excellent afterglow characteristic was realized.

Figure 16:
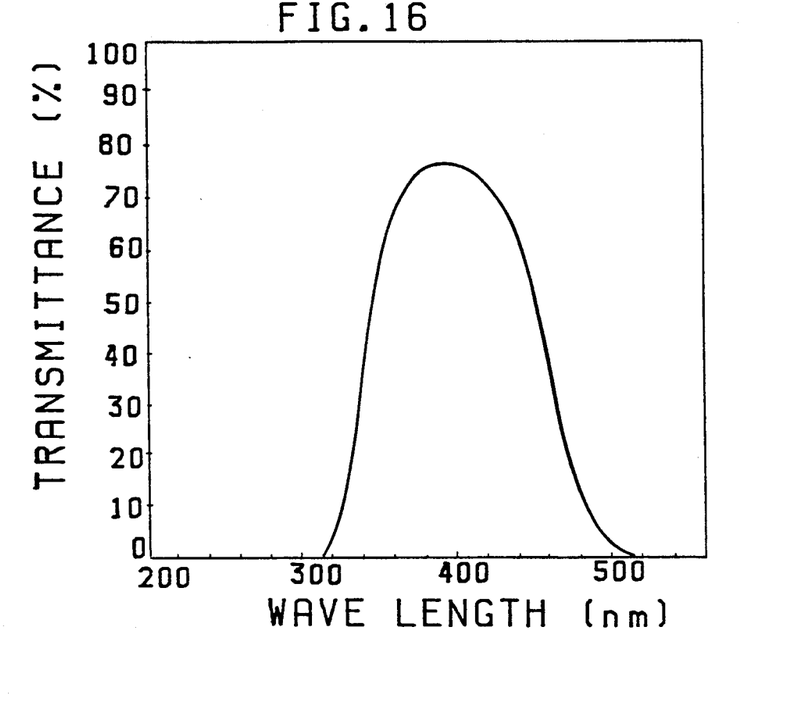
FIG. 16 is a graph showing the characteristic of the filter used in measuring the brightness of the phosphor.
Figure 17:
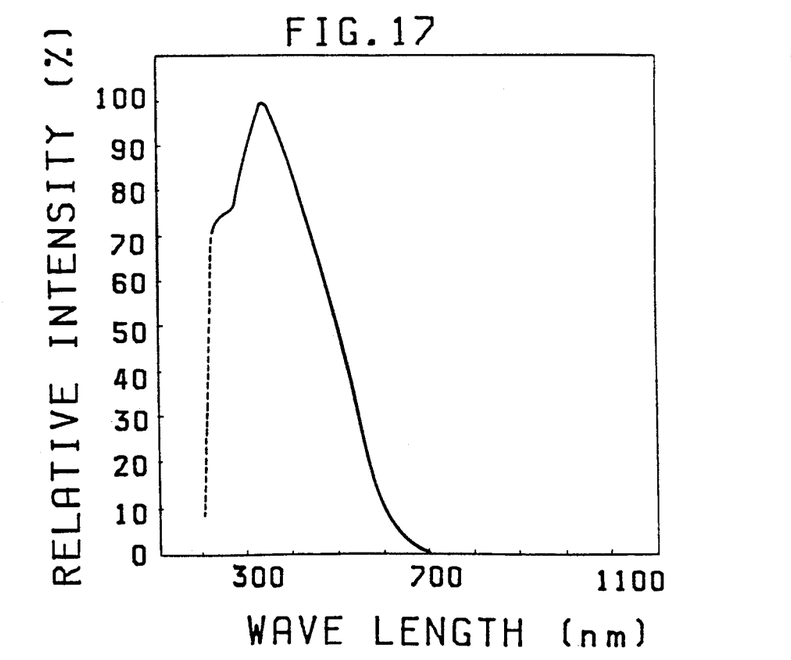
FIG. 17 is a graph showing the sensitivity characteristic of the photomultiplier used in measuring the brightness of the phosphor.

In the measurements of Table 2, the brightness of the phosphor was measured by the steps of irradiating the phosphor with X-ray, passing the light emitted by the phosphor through a filter of the charactristics shown in FIG. 16, and irradiating a photomultiplier with the light so as to exchange the strength of light to an electric current, and then comparing the strengths of the output electric current. In FIG. 17, the sensitivity characteristic of the photomultiplier is shown.

TABLE 1

| LIGHT EMISSION CHARACTERISTIC OF PHOSPHOR | | |
|---|---|---|
| PHOSPHOR | BRIGHTNESS | AFTERGLOW |
| CONVENTIONAL PHOSPHOR 3 $Y_{0.998}TaO_4:0.002Tm^{3+}$ | 100% | −3.15 |

TABLE 1-continued

| LIGHT EMISSION CHARACTERISTIC OF PHOSPHOR | | |
|---|---|---|
| PHOSPHOR | BRIGHTNESS | AFTERGLOW |
| EXAMPLE 3 $Mg_{0.06}Y_{0.958}TaO_4:0.002Tm^{3+}$ | 105% | −4.30 |
| CONVENTIONAL PHOSPHOR 4 $Y_{0.998}TaO_4:0.002Tm^{3+}$ | 100% | −3.15 |
| EXAMPLE 4 $Ba_{0.001}Y_{0.99788}TaO_4:0.002Tm^{3+}$ | 110% | −3.82 |
| CONVENTIONAL PHOSPHOR 5 $Gd_{0.997}TaO_4:0.003Tm^{3+}$ | 100% | −3.10 |
| EXAMPLE 5 $Be_{0.005}Gd_{0.9987}TaO_4:0.003Tm^{3+}$ | 103% | −3.98 |
| CONVENTIONAL PHOSPHOR 6 $Y_{0.4975}Gd_{0.4975}TaO_4:0.005Tm^{3+}$ | 100% | −3.12 |
| EXAMPLE 6 $Zn_{0.01}Y_{0.49415}Gd_{0.49415}TaO_4:0.005Tm^{3+}$ | 110% | −4.05 |
| CONVENTIONAL PHOSPHOR 7 $Y_{0.4975}La_{0.4975}TaO_4:0.005Tm^{3+}$ | 100% | −3.10 |
| EXAMPLE 7 $Cd_{0.01}Y_{0.49415}La_{0.09415}TaO_4:0.005Tm^{3+}$ | 105% | −4.01 |
| CONVENTIONAL PHOSPHOR 8 $Y_{0.995}Ta_{0.995}Nb_{0.005}O_4:0.005Tm^{3+}$ | 100% | −3.41 |
| EXAMPLE 8 $Sr_{0.002}Y_{0.9937}Ta_{0.995}Nb_{0.005}O_4:0.005Tm^{3+}$ | 170% | −5.65 |

TABLE 2

| LIGHT EMISSION CHARACTERISTIC OF PHOSPHOR AND X-RAY INTENSIFING SCREEN | | | |
|---|---|---|---|
| | POWDER | | X-RAY INTENSIFING SCREEN |
| PHOSPHOR | BRIGHTNESS | AFTERGLOW | BRIGHTNESS |
| CONVENTIONAL PHOSPHOR 9 $YTaO_4$ | 100% | −3.12 | 100% |
| EXAMPLE 9 $Sr_{0.075}Y_{0.950}TaO_4$ | 144% | −5.74 | 129% |
| EXAMPLE 10 $Ca_{0.075}Y_{0.950}TaO_4$ | 123% | −6.05 | 121% |
| EXAMPLE 11 $Ba_{0.03}Y_{0.98}TaO_4$ | 149% | −4.02 | 140% |
| EXAMPLE 12 $Mg_{0.03}Y_{0.98}TaO_4$ | 138% | −4.24 | 123% |
| EXAMPLE 13 $Cd_{0.15}Y_{0.90}TaO_4$ | 143% | −5.68 | 141% |
| EXAMPLE 14 $Zn_{0.08}Y_{0.98}TaO_4$ | 142% | −4.19 | 127% |
| EXAMPLE 15 $Be_{0.08}Y_{0.975}Ta_{0.995}Nb_{0.005}O_4:0.005Tm^{3+}$ | 128% | −4.06 | 120% |
| CONVENTIONAL PHOSPHOR 10 $Y_{0.995}TaO_4:0.005Tm^{3+}$ | 98% | −3.26 | 100% |
| EXAMPLE 16 $Sr_{0.030}Y_{0.975}TaO_4:0.005Tm^{3+}$ | 135% | −4.91 | 128% |
| CONVENTIONAL PHOSPHOR 11 $Y_{0.4975}Gd_{0.4975}TaO_4:0.005Tm^{3+}$ | 41% | −3.89 | 38% |
| EXAMPLE 17 $Ba_{0.1500}Y_{0.4475}Gd_{0.4475}TaO_4:0.005Tm^{3+}$ | 62% | −5.09 | 60% |
| CONVENTIONAL PHOSPHOR 12 $Y_{0.4975}La_{0.4975}TaO_4:0.005Tm^{3+}$ | 64% | −3.78 | 62% |
| EXAMPLE 18 $Cd_{0.900}Y_{0.9975}La_{0.3975}TaO_4:0.005Tm^{3+}$ | 92% | −6.20 | 91% |

Such inclinations as shown in FIGS. 1 to 8 were also seen when in the general formula (I), M is Be, Mg, Ca, Sr, Ba, Zn and Cd, and the afterglow characteristic and the brightness were improved.

Further, when in the general formula (I), M is more than two selected from the group of Be, Mg, Ca, Sr, Ba, Zn and Cd, the similar inclination appeared.

What is claimed is:

1. A phosphor which emits light by the excitation of X-rays, and has a composition represented by the formula:

where:
M is Sr,
Ln is at least one rare earth element selected from the group consisting of Y, Gd and La,
D is Ta, or Ta and Nb,
R is Tm,
y is a value in the range of 0.030 to 0.075, and x is a value in the range of 0 to 0.05,
said phosphor being obtained by a process comprising admixing an oxide of Ln in an amount corresponding to 1-x-($\frac{5}{3}$)y parts by mol of Ln, an oxide of D in an amount corresponding to one part by mol of D, an oxide of R in an amount corresponding to x parts by mol of R, a carbonate of M in an amount corresponding to y parts by mol of M and lithium chloride flux to prepare an admixture, and
firing said admixture at a temperature sufficient to provide a phosphor having said composition and
wherein said phosphor exhibits improved brightness and a smaller afterglow than the same phosphor absent M.

2. An X-ray intensifying screen comprising a support and a phosphor layer formed on said support comprising the phosphor of claim 1.

3. The phosphor according to claim 1 having the formula $Sr_{0.075}Y_{0.950}TaO_4$.

4. An X-ray intensifying screen comprising a support and a phosphor layer formed on said support comprising the phosphor of claim 3.

5. The phosphor according to claim 1 having the formula $Sr_{0.030}Y_{0.975}TaO_4$: 0.005 $Tm^{3+}$.

6. An X-ray intensifying screen comprising a support and a phosphor layer formed on said support comprising the phosphor of claim 5.

* * * * *